(12) United States Patent
Jo (10) Patent No.: US 11,380,106 B2
(45) Date of Patent: Jul. 5, 2022

(54) SYSTEM, APPARATUS, AND METHOD FOR VEHICLE CONTROL AND IMAGE SENSOR

(71) Applicant: MANDO MOBILITY SOLUTIONS CORPORATION, Gyeonggi-do (KR)

(72) Inventor: Min Gwan Jo, Gyeonggi-do (KR)

(73) Assignee: MANDO MOBILITY SOLUTIONS CORPORATION, Gyeonggi-Do (KR)

(*) Notice: Subject to any disclaimer, the term of this patent is extended or adjusted under 35 U.S.C. 154(b) by 145 days.

(21) Appl. No.: 16/205,198

(22) Filed: Nov. 29, 2018

(65) Prior Publication Data
US 2019/0163986 A1 May 30, 2019

(30) Foreign Application Priority Data

Nov. 30, 2017 (KR) .......................... 10-2017-0162760

(51) Int. Cl.
*G06V 20/56* (2022.01)
*G06T 7/70* (2017.01)
(Continued)

(52) U.S. Cl.
CPC ............. *G06V 20/56* (2022.01); *B60W 50/00* (2013.01); *G05D 1/0214* (2013.01); *G06T 7/20* (2013.01); *G06T 7/60* (2013.01); *G06T 7/70* (2017.01); *G06V 20/58* (2022.01); *G06V 20/64* (2022.01); *B60R 1/00* (2013.01); *B60R 2300/30* (2013.01); *G01S 13/867* (2013.01); *G01S 13/89* (2013.01);
(Continued)

(58) Field of Classification Search
CPC ........... G06K 9/00791; G06K 9/00805; G06K 9/00201; G06T 7/70; G06T 2207/10028; G06T 17/70; G06T 7/60; B60W 2050/0035; B60W 2050/0036; B60W 50/00
See application file for complete search history.

(56) References Cited

U.S. PATENT DOCUMENTS 9,740,945 B2 * 8/2017 Divekar .................... B60R 1/00
10,691,132 B2 * 6/2020 Hwang ................ G06V 20/588
2017/0371347 A1 * 12/2017 Cohen .................. B60W 30/08

FOREIGN PATENT DOCUMENTS

JP       2015-72650        4/2015
KR    10-2016-0040911     4/2016
(Continued)

OTHER PUBLICATIONS

Office Action dated Jan. 4, 2019 for Korean Patent Application No. 10-2017-0162760 and its English machine translation by Google Translate.
(Continued)

*Primary Examiner* — Ig T An
(74) *Attorney, Agent, or Firm* — Ladas & Parry, LLP (57) ABSTRACT

Provided are a system, apparatus, and method for vehicle control and more particularly. The apparatus includes a first spatial information generator configured to generate first spatial information at a vicinity of a host vehicle, based on at least one of image data or sensing data, a vehicle specification receiver configured to receive first vehicle information, which is vehicle information of at least one of external vehicles existing the vicinity of the host vehicle and a second spatial information generator configured to generate second spatial information of the vicinity of the host vehicle by modifying the first spatial information based on the first vehicle information.

20 Claims, 9 Drawing Sheets

(51) Int. Cl.
   *G05D 1/02*     (2020.01)
   *G06T 7/20*     (2017.01)
   *B60W 50/00*    (2006.01)
   *G06V 20/58*    (2022.01)
   *G06V 20/64*    (2022.01)
   *G01S 13/86*    (2006.01)
   *H04W 4/40*     (2018.01)
   *B60R 1/00*     (2022.01)
   *G01S 15/89*    (2006.01)
   *G01S 13/89*    (2006.01)
   *H04L 67/12*    (2022.01)
   *G06T 7/60*     (2017.01)

(52) U.S. Cl.
   CPC ..... *G01S 15/89* (2013.01); *G06T 2207/30241* (2013.01); *G06T 2207/30261* (2013.01); *G06V 2201/08* (2022.01); *H04L 67/12* (2013.01); *H04W 4/40* (2018.02)

(56) References Cited

FOREIGN PATENT DOCUMENTS

| KR | 1020160040911 | * | 4/2016 | ........... G08G 1/0968 |
| KR | 10-2017-0035238 |   | 3/2017 | |
| KR | 1020170035238 | * | 3/2017 | ............ B60W 50/01 |

OTHER PUBLICATIONS

Office Action dated Sep. 26, 2019 for Korean Patent Application No. 10-2017-0162760 and its English machine translation by Google Translate.

* cited by examiner

SYSTEM, APPARATUS, AND METHOD FOR VEHICLE CONTROL AND IMAGE SENSOR

CROSS REFERENCE TO RELATED APPLICATION

This application claims priority from Korean Patent Application No. 10-2017-0162760, filed on Nov. 30, 2017, which is hereby incorporated by reference for all purposes as if fully set forth herein.

BACKGROUND OF THE INVENTION

1. Field of the invention

The present disclosure relates to a system, apparatus, and method for vehicle control and more particularly, to a technology for recognizing a travelable space on the basis of three-dimensional (3D) vehicle recognition and controlling travel of a host vehicle.

2. Description of the Prior Art

With an increase in interest in autonomous driving, research on a technology for recognizing a surrounding space of a host vehicle is being conducted lately. In this regard, according to related arts, a technology for recognizing a surrounding space of a host vehicle by capturing the surrounding space of the host vehicle with a camera installed in the host vehicle is mainly used. However, the method of recognizing space with a camera is limited in three-dimensional (3D) space recognition because it is not possible to obtain accurate information of a length, a width, etc. of an obstacle, such as a nearby host vehicle.

SUMMARY OF THE INVENTION

In this background, the present disclosure is to provide a vehicle control technology based on three-dimensional (3D) space recognition.

Also, the present disclosure is to provide a vehicle control technology based on 3D space recognition in which specification information of another vehicle is used.

Further, the present disclosure is to provide a technology for controlling a host vehicle on the basis of an expected travel region of another vehicle.

Moreover, the present disclosure is to provide a technology for generating a travel path of a host vehicle on the basis of 3D space recognition.

An embodiment provides a system for vehicle control, the system including: an image sensor mounted to a host vehicle to have a field of view out of the host vehicle and configured to capture image data; a communicator configured to receive first vehicle information related to at least one of external vehicles existing outside the host vehicle; at least one processor configured to process the image data captured by the image sensor and the first vehicle information received by the communicator; and a controller configured to: generate first spatial information at a vicinity of the host vehicle based on the image data; generate second spatial information by modifying the first spatial information based on the first vehicle information; and provide a control signal to the host vehicle based on the second spatial information.

Another embodiment provides an apparatus for vehicle control, the apparatus including: a first spatial information generator configured to generate first spatial information at a vicinity of a host vehicle, based on at least one of image data or sensing data; a vehicle specification receiver configured to receive first vehicle information, which is vehicle information of at least one of external vehicles existing the vicinity of the host vehicle; and a second spatial information generator configured to generate second spatial information of the vicinity of the host vehicle by modifying the first spatial information based on the first vehicle information.

Another embodiment provides a method for vehicle control, the method including: generating first spatial information at a vicinity of a host vehicle, based on at least one of image data or sensing data; receiving first vehicle information, which is vehicle information of at least one of external vehicles existing the vicinity of the host vehicle; and generating second spatial information of the vicinity of the host vehicle by modifying the first spatial information based on the first vehicle information.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

As the present disclosure allows for various changes and numerous embodiments, particular embodiments will be illustrated in the drawings and described in detail herein. However, this is not intended to limit the present disclosure to particular modes of practive, and it is to be appreciated that all changes, equivalents, and substitutes that do not depart from the spirit and technical scope of the present disclosure are encompassed in the present disclosure. In the following description of the present disclosure, a detailed description of known arts incorporated herein will be omitted when it is determined that the description may make the subject matter of the present disclosure rather unclear. As used herein, the singular forms are generally intended to indicate the plural forms as well unless the context clearly indicates otherwise.

Hereinafter, exemplary embodiments of the present disclosure will be described in detail with reference to the accompanying drawings. While description is made with reference to the drawings, like or corresponding elements are denoted by the same reference numerals, and descriptions thereof will not be reiterated.

Figure 1A:
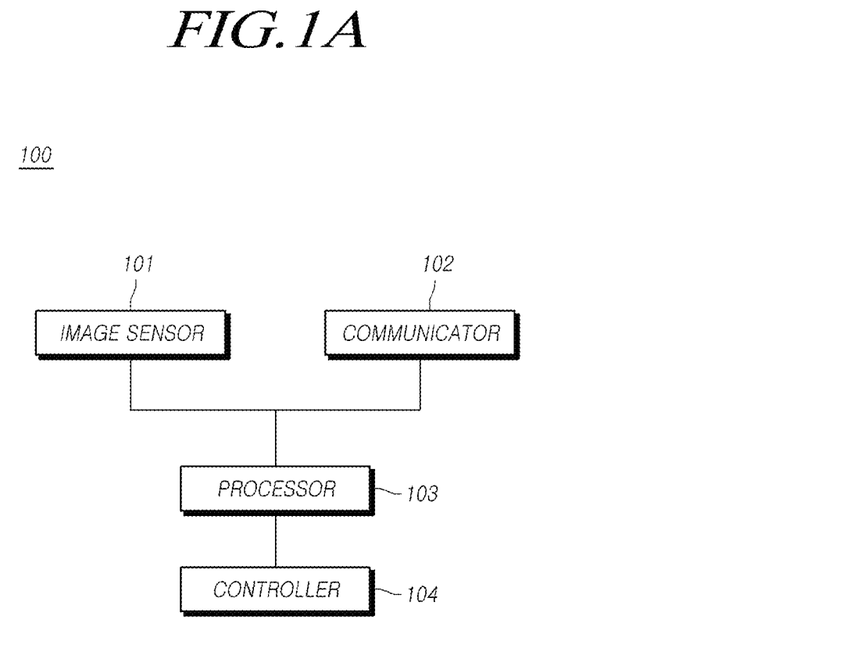
FIG. 1A shows a configuration of a system for vehicle control based on three-dimensional (3D) vehicle recognition according to an embodiment of the present disclosure.
Figure 1B:
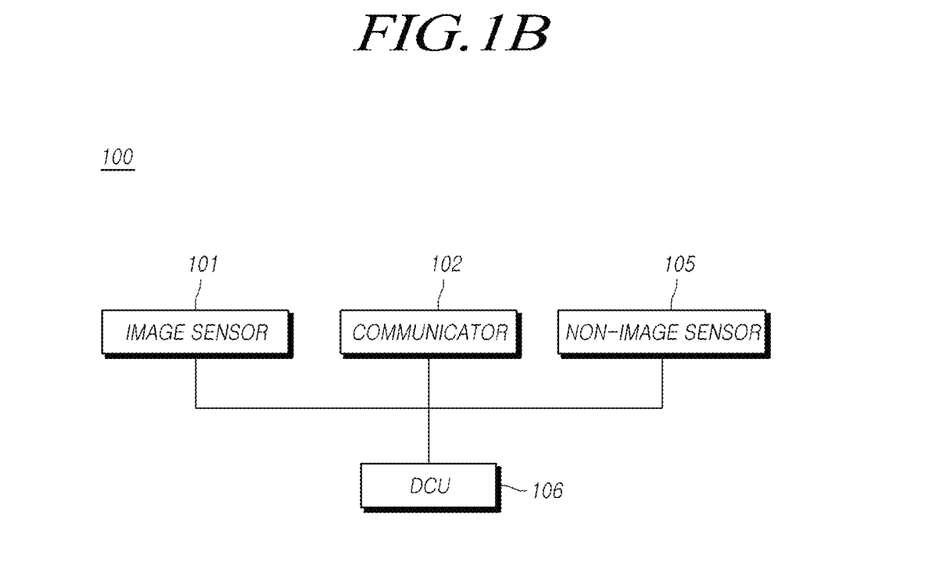
FIG. 1B shows a configuration of a system for vehicle control based on 3D vehicle recognition according to another embodiment of the present disclosure.
Figure 1C:
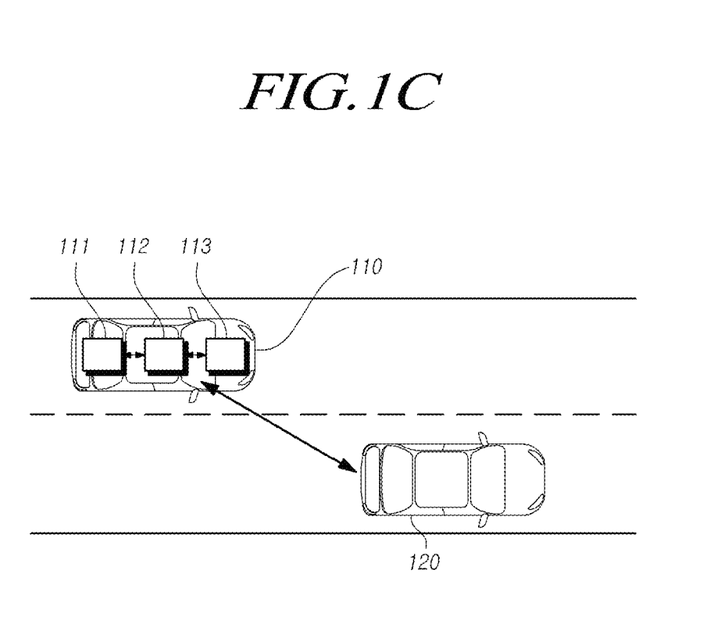
FIG. 1C shows a configuration of a system for vehicle control based on 3D vehicle recognition according to another embodiment of the present disclosure.

FIG. 1A shows a configuration of a system for vehicle control based on three-dimensional (3D) vehicle recognition according to an embodiment of the present disclosure, FIG. 1B shows a configuration of a system for vehicle control based on 3D vehicle recognition according to another embodiment of the present disclosure, and FIG. 1C shows a configuration of a system for vehicle control (referred to as "vehicle control system" below) based on 3D vehicle recognition according to another embodiment of the present disclosure.

Referring to FIG. 1A, a vehicle control system 100 based on 3D vehicle recognition according to an embodiment of the present disclosure may include an image sensor 101 mounted to a host vehicle to have a field of view out of the host vehicle and configured to capture image data, a communicator 102 configured to receive first vehicle information related to at least one of external vehicles existing outside the host vehicle, at least one processor 103 configured to process the image data captured by the image sensor 101 and the first vehicle information received by the communicator 102, and a controller 104 configured to generate spatial information at least partially on the basis of processing of the image data and the first vehicle information.

There may be at least one image sensor 101, and a plurality of image sensors 101 may be installed in respective parts of the host vehicle to have fields of view in forward, lateral, and rear directions of the host vehicle.

Since image information acquired by the image sensor 101 is configured as image data, the image information may denote image data captured by the image sensor 101. In the present disclosure, image information acquired by the image sensor 101 denotes image data captured by the image sensor 101 below.

The image data captured by the image sensor 101 may be generated in one format among, for example, raw audio/video interleaving (AVI), Motion Picture Experts Group-4 (MPEG-4), H.264, DivX, and Joint Photographic Experts Group (JPEG).

The image data captured by the image sensor may be processed by the processor 103, and the image data processed by the processor 103 may include sensing information of an object near the host vehicle.

The communicator 102 may receive first vehicle information, which is vehicle information of another vehicle. In other words, the communicator 102 may use V2X communication to allow wireless communication between vehicles.

Here, the vehicle information may include specification information of external vehicles and another vehicle may denote at least one of the external vehicles.

Hereinafter, the specification information will be described below in order to facilitate understanding of the present disclosure, but it is not limited to the specification information. Also, another vehicle described below may mean at least one of the external vehicles. In the present disclosure, V2X indicates an operation or technology in which a vehicle exchanges information with objects, such as a nearby vehicle, a mobile device, and a road, via a wired or wireless network. V2X includes the concepts of vehicle-to-vehicle (V2V) communication, vehicle-to-infrastructure (V2I) communication, vehicle-to-nomadic device (V2N) communication, vehicle-to-pedestrian (V2P) communication, etc., and V2V communication may be mainly used in the present disclosure.

V2X is based on dedicated short-range communications (DSRC). V2X may use Wireless Access in Vehicular Environment (WAVE) technology, which has been recently proposed by Institute of Electrical and Electronic Engineers (IEEE), or IEEE 802.11 p employing a 5.9 GHz band. However, V2X is not limited thereto and is to be construed as including any V2X communication which is currently developed or will be developed in the future.

The processor 103 may extract or acquire information required to control the host vehicle by processing data.

The controller 104 configured to generate first spatial information at a vicinity of the host vehicle based on the image data, generate second spatial information by modifying the first spatial information based on the first vehicle information and provide a control signal to the host vehicle based on the second spatial information.

Here, the expression of modifying may include the meaning of calibrating.

The controller 104 is operable to generate first spatial information, which is spatial information of the vicinity of the host vehicle, on the basis of results of image data processing and to generate second spatial information of the vicinity of the host vehicle by calibrating the first spatial information on the basis of the first specification information.

Here, the controller 104 may acquire travel information of at least one of the external vehicles included in the first spatial information from the image data, determines an expected travel region of at least one of the external vehicles included in the first spatial information based on at least one of the first vehicle information or the travel information of at least one of the external vehicles included in the first spatial information, and generates a travel path of the host vehicle in consideration of the expected travel region.

Also, the controller 104 may extracts second vehicle information, which is vehicle information of at least one of the external vehicles included in the first spatial information, and generates the second spatial information by comparing the first vehicle information and the second vehicle information and determining pieces of the first vehicle information corresponding to the second vehicle information.

The controller 104 may be implemented as a domain control unit (DCU) which may integratively perform a function of the processor 103 for processing data, a function of outputting a generated control signal to a driver-assistance system (DAS), a steering control module, a brake control module, etc., and the like.

The vehicle control system 100 may additionally include non-image sensors including a radar sensor, a light detection and ranging (LiDAR) sensor, an ultrasonic sensor, and the like.

The vehicle control system 100, which may be implemented to additionally include the DCU and the non-image sensors, will be described below.

Referring to FIG. 1B, a vehicle control system 100 according to another embodiment of the present disclosure may include an image sensor 101 mounted to a host vehicle to have a field of view out of the host vehicle and may be configured to capture image data, a communicator 102 configured to receive first specification information related to another vehicle existing outside the host vehicle using V2X communication, a non-image sensor 105 mounted to the host vehicle to have a sensing area outside the host vehicle and configured to capture sensing data, and a DCU 106 configured to process the first specification information received by the communicator 102 and at least one of the image data captured by the image sensor 101 or the sensing data captured by the non-image sensor 105 and control at least one DAS provided in the host vehicle.

The image sensor 101 and the communicator 102 are the same as described above with reference to FIG. 1A.

The non-image sensor 105 may include, for example, a near infrared sensor, a far infrared sensor, a radar sensor, an ultrasonic sensor, a LiDAR sensor, and the like. The non-image sensor 105 is mounted to the host vehicle and functions to capture sensing data so as to sense one of objects near the host vehicle. Specifically, the non-image sensor 105 indicates a sensor which transmits electromagnetic waves, such as radar waves, ultrasonic waves, or the like, and calculates information including a distance to a target object, a position of the target object, etc by receiving and analyzing a signal reflected by the target object.

The DCU 106 is operable to generate first spatial information, which is spatial information of the vicinity of the host vehicle, on the basis of results of processing at least one of the image data or the sensing data and to generate second spatial information of the vicinity of the host vehicle by calibrating the first spatial information on the basis of results of processing the first specification information.

The DCU 106 may be configured to receive image data captured by at least one image sensor, receive sensing data captured by a plurality of non-image sensors, and process at least one of the image data or the sensing data. Also, the DCU 106 may be configured to process the first specification information received by the communicator 102. For such processing, the DCU 106 may include at least one processor.

The DCU 106 may be provided in the host vehicle and communicate with the at least one image sensor 101 and the at least one non-image sensor 105 installed in the host vehicle. To this end, an appropriate data link or communication link, such as a vehicle network bus, for data transmission or signal communication may be additionally included.

The DCU 106 may operate to control one or more of several DASs used in the host vehicle. The DCU 106 may control DASs, such as a blind spot detection (BSD) system, an adaptive cruise control (ACC) system, a lane departure warning (LDWS) system, a lane keeping assist system (LKAS), a lane change assistant system (LCAS), etc., using expected visibility range information and the like which is determined on the basis of sensing data captured by the plurality of non-image sensors 105 and on the basis of image data captured by the image sensor 101.

Specifically, the DCU 106 according to an embodiment of the present disclosure may change the size of an alarm area of the BSD system for warning about an obstacle behind the host vehicle on the basis of the determined expected visibility range information.

The DCU 106 may change the size of a preceding vehicle recognition region or an adaption-target vehicle determination region in the ACC system for travel adapted to a preceding vehicle on the basis of the determined expected visibility range information.

The DCU 106 may change the size of a departure warning region or a departure judgement region of the LDWS on the basis of the determined expected visibility range information.

The DCU 106 may change the size of a lane keeping judgement region or a lane departure warning region of the LKAS on the basis of the determined expected visibility range information.

The DCU 106 may change the size of a lane change completion judgement region of the LCAS or a warning region for warning about the approach of a nearby vehicle upon changing lanes on the basis of the determined expected visibility range information.

FIG. 1C shows a host vehicle 110, which is a control target of the vehicle control system 100 based on 3D vehicle recognition, and another vehicle 120 existing near the host vehicle 110. The host vehicle 110 which is one of control targets of the vehicle control system 100 may include a vehicle sensor 111, an apparatus 112 for vehicle control (referred to as "vehicle control apparatus" below), and an instrument unit 113.

Another vehicle 120 may denote at least one of the external vehicles.

The vehicle sensor 111 may include at least one of the image sensor 101 or the non-image sensor 105 described above.

The vehicle control apparatus 112 may detect an empty space on the basis of at least one of image data and sensing data and specification information of the other vehicle 120 received from the other vehicle 120 and generate a travel path of the host vehicle 110 in consideration of the detected empty space. The instrument unit 113 may drive the host vehicle 110 along the generated travel path.

The vehicle control apparatus 112 will be described in detail below with reference to FIGS. 2 to 7.

Figure 2:
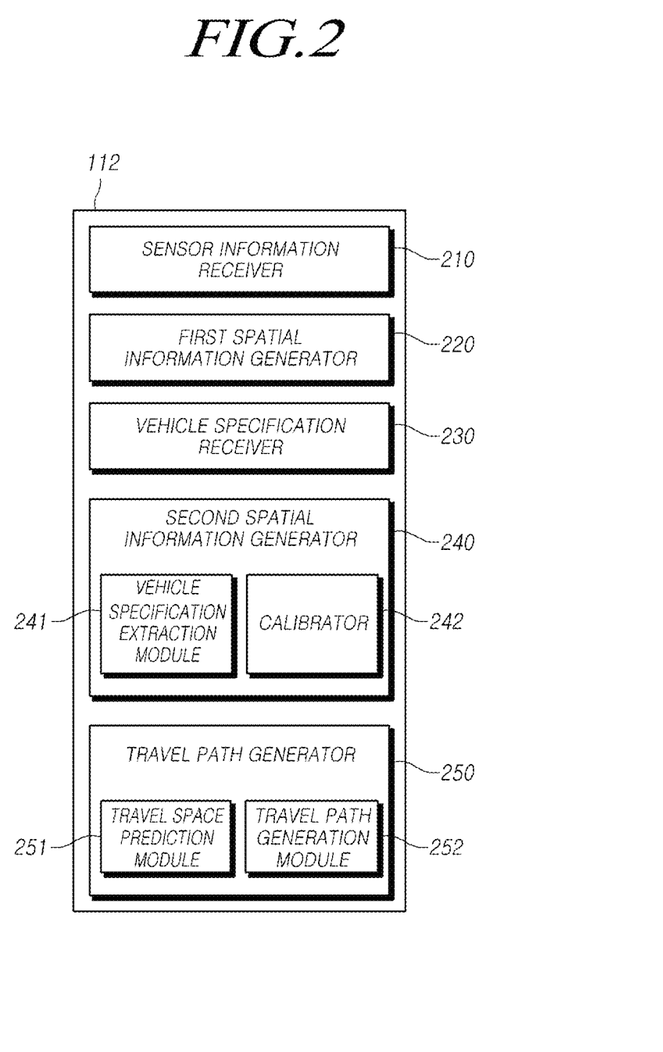
FIG. 2 is a block diagram of an apparatus for vehicle control according to an embodiment of the present disclosure.

FIG. 2 is a block diagram of a vehicle control apparatus according to an embodiment of the present disclosure.

Referring to FIG. 2, the vehicle control apparatus 112 may include a sensor information receiver 210, a first spatial information generator 220, a vehicle specification receiver 230, a second spatial information generator 240, and a travel path generator 250.

The sensor information receiver 210 may receive sensor information, which is scan information generated using a camera sensor, a LiDAR sensor, an ultrasonic sensor, a radar sensor, etc., from the vehicle sensor 111.

The first spatial information generator 220 may generate first spatial information at the vicinity of the host vehicle 110 on the basis of the sensor information of the host vehicle 110.

The vehicle specification receiver 230 may receive first specification information, which is specification information of the other vehicle 120 existing existing the vicinity of the host vehicle 110.

Here, the specification information of the other vehicle 120 may include at least one of a vehicle width, a vehicle length, or a maximum turning angle. Also, the specification information of the other vehicle 120 may be a basic safety message.

Here, the other vehicle 120 may include at least one of the external vehicles included in the first spatial information. Accordingly, the other vehicle 120 described below may mean at least one of the external vehicles included in the first spatial information.

In an embodiment, the vehicle specification receiver 230 may receive the specification information from the other vehicle 120. For example, the vehicle specification receiver 230 may receive the specification information from the other vehicle 120 using V2X communication, which is a vehicle communication method.

The second spatial information generator 240 may generate second spatial information on the basis of the first spatial information and the specification information of the other vehicle 120.

The second spatial information generator 240 may generate second spatial information of the vicinity of the host vehicle by modifying the first spatial information based on the first vehicle information.

In an embodiment, the second spatial information generator 240 may include a vehicle specification extraction module 241 and a calibrator 242.

The vehicle specification extraction module 241 may extract second specification information, which is specification information of the other vehicle 120, from the first spatial information.

Here, the second specification information may be information on specifications or travel, such as a vehicle width, a vehicle length, a velocity, and a travel direction, of the other vehicle 120.

The calibrator 242 may generate the second spatial information by comparing the first vehicle information and the second vehicle information and determining pieces of the first vehicle information corresponding to the second vehicle information.

The calibrator 242 may compare the first specification information and the second specification information, determine pieces of the first specification information corresponding to the second specification information, and generate second spatial information by calibrating the first spatial information on the basis of the determined pieces of first specification information. Here, the second spatial information may be 3D space information.

In an embodiment, the calibrator 242 may perform calibration using Equation 1.

$$L_{vehicle} = a*L_{image} + b*L_{v2x} \quad \text{[Equation 1]}$$

when $a=\sin(\theta)$, $b=-\sin(\theta)+1$ $\theta$ is relative heading angle, $0 \leq \theta \leq 90$ Here, $L_{image}$ is a length of the other vehicle 120 included in the first spatial information, and $L_{v2x}$ is length information included in the second specification information received from the other vehicle 120 through V2X communication. It is apparent that Equation 1 may be applied not only to a vehicle length but also to a vehicle width.

The travel path generator 250 may generate a travel path of the host vehicle 110 on the basis of the 3D space information. In an embodiment, the travel path generator 250 may include a travel space prediction module 251 and a travel path generation module 252.

The travel space prediction module 251 may determine an expected travel region in which the other vehicle 120 is likely to travel in the 3D space information on the basis of at least one of the first specification information or the second specification information.

Specifically, The travel space prediction module 251 may extract travel information of at least one of the external vehicles included in the first spatial information by processing at least one of the image data or the sensing data, and The travel space prediction module 251 may determine an expected travel region of at least one of the external vehicles included in the first spatial information based on at least one of the first vehicle information or the travel information.

According to an embodiment, when the other vehicle 120 is a preceding vehicle which exists in front of the host vehicle 110 and is traveling on the same road as the host vehicle 110, the travel space prediction module 251 may display an expected travel region behind the other vehicle 120 in the second spatial information.

According to another embodiment, when the other vehicle 120 is an opposite vehicle which exists in front of the host vehicle 110 and is traveling to approach the host vehicle 110, the travel space prediction module 251 may display an expected travel region in front of the other vehicle 120 in the second spatial information.

According to another embodiment, when the other vehicle 120 is a preceding vehicle which exists in front of the host vehicle 110 and is traveling on a road adjacent to a road on which the host vehicle 110 is traveling or a crossing vehicle which exists in front of the host vehicle 110 and is traveling in a direction of moving away from the host vehicle 110, the travel space prediction module 251 may display an expected travel region in front of and behind the other vehicle 120 in the second spatial information.

The travel path generation module 252 may generate a travel path in which the host vehicle 110 will travel on the basis of at least one of the 3D space information or the expected travel region.

In an embodiment, the second spatial information generator 240 may accumulate second specification information received from the other vehicle 120 and determine an expected travel region of the other vehicle 120.

Figure 3:
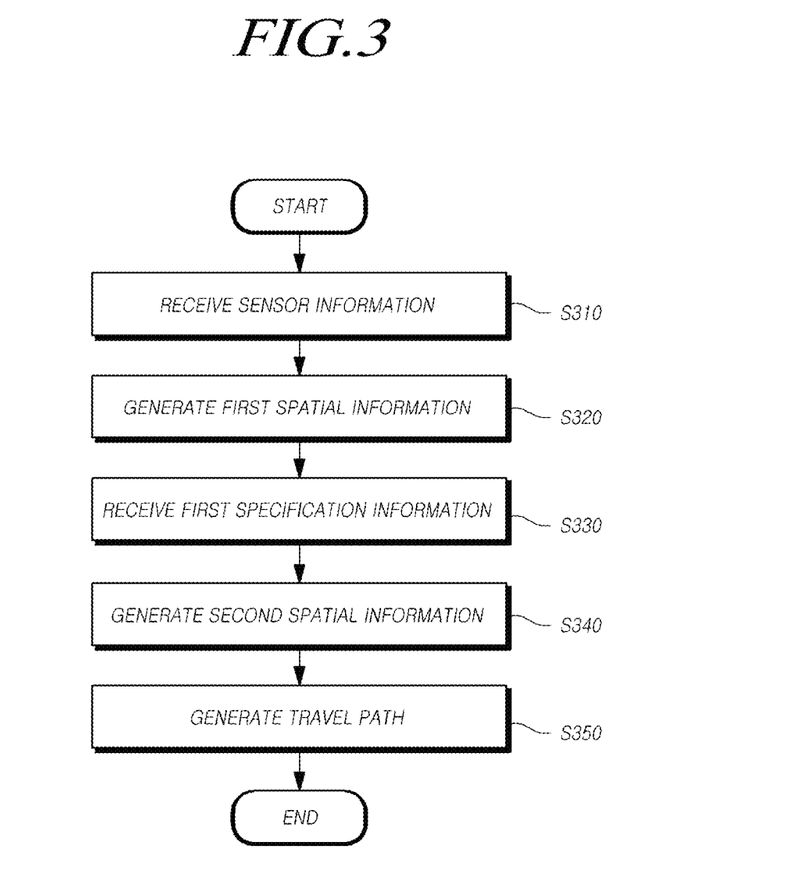
FIG. 3 is a flowchart of a method for vehicle control based on 3D vehicle recognition according to an embodiment of the present disclosure.

FIG. 3 is a flowchart of a method for vehicle control based on 3D vehicle recognition according to an embodiment of the present disclosure.

The method performed by the vehicle control apparatus 112 shown in FIG. 1C will be described below as an example.

Referring to FIG. 3, in operation S310, the vehicle control apparatus may receive scan information that the vehicle sensor 111, such as a LiDAR sensor, an ultrasonic sensor, a radar sensor, etc., has obtained by scanning the vicinity of the host vehicle 110.

In operation S320, the vehicle control apparatus may generate first spatial information, which is information on the vicinity of the host vehicle 110, on the basis of the scan information.

In operation S330, the vehicle control apparatus may receive first specification information, which is specification information of at least one of external vehicles existing the vicinity of the host vehicle, from the other vehicle 120 using a vehicle communication method such as V2X communication.

In operation S340, the the vehicle control apparatus may extract second specification information, which is specification information of the other vehicle 120 existing the vicinity of the host vehicle 110, from the first spatial information. The vehicle control apparatus may generate the second spatial information of the vicinity of the host vehicle 110 by modifying the first spatial information based on the first specification information.

In operation S350, the vehicle control apparatus may generate a travel path in which the host vehicle 110 will travel on the basis of the second spatial information. Also, the vehicle control apparatus may determine an expected travel region in which the other vehicle 120 is likely to travel on the basis of the second spatial information and at least one of the first specification information or the second specification information and generate a travel path of the host vehicle 110 on the basis of at least one of the expected travel region and the second spatial information.

Figure 4:
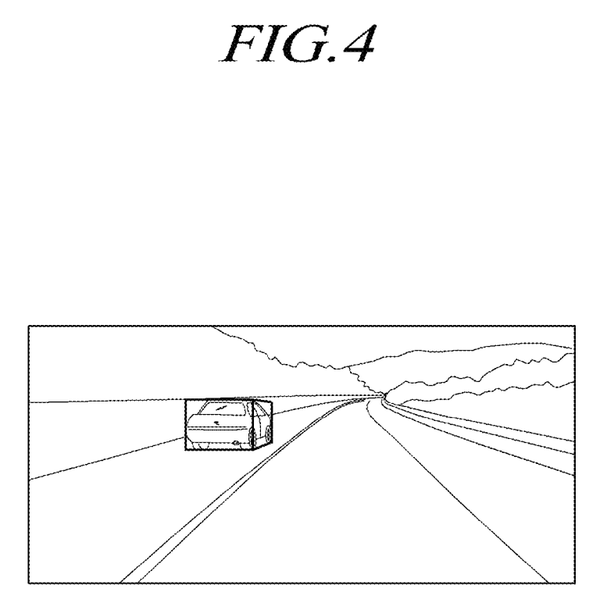
FIG. 4 is a view illustrating an example of second spatial information according to an embodiment of the present disclosure.

FIG. 4 is a view illustrating an example of second spatial information according to an embodiment of the present disclosure.

FIG. 4 shows second spatial information in which a 3D model of another vehicle 120 has been generated by calibrating first spatial information, which has been generated on the basis of a camera sensor, on the basis of second specification information received from the other vehicle 120. In this way, even when it is not possible to know an actual width or length of the other vehicle 120, a road, or the like with the camera sensor alone, the vehicle control apparatus 112 according to an embodiment of the present disclosure generates second spatial information, which is 3D information of the vicinity of the host vehicle 110, and thus it is possible to find a space in which the host vehicle 110 may avoid the other vehicle 120 and travel.

Figure 5:
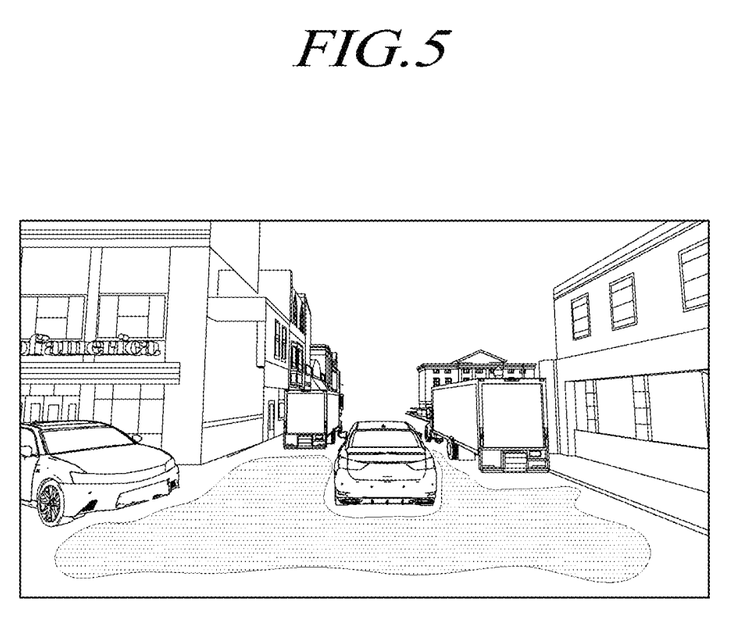
FIGS. 5 and 6 are views illustrating an expected travel region according to an embodiment of the present disclosure.
Figure 6:
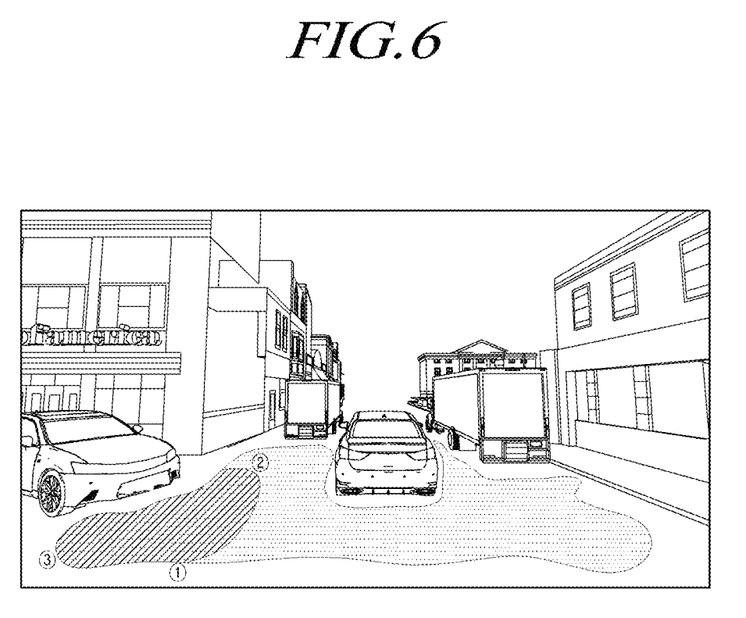

FIGS. 5 and 6 are views illustrating an expected travel region according to an embodiment of the present disclosure.

FIG. 5 shows second spatial information, which is 3D spatial information generated by calibrating first spatial information on the basis of second specification information received from another vehicle 120, and a region in which any obstacle such as the other vehicle 120 does not exist is displayed in the second spatial information.

FIG. 6 shows, in the second spatial information shown in FIG. 5, an expected travel region in which the other vehicle 120 is predicted to travel on the basis of information including a width, a length, a maximum turning angle, a velocity, etc. of the other vehicle 120. Specifically, since the other vehicle 120 is predicted to travel in any one region of ①, ②, and ③, the expected travel region of the other vehicle 120 may be detected as shown in FIG. 6. ① denotes a maximum movable region of the other vehicle 120 (in consideration of lengths and widths of the other vehicle 120 and a corresponding vehicle) when a travel direction of the other vehicle 120 has an angle of 0. ② denotes a maximum movable region of the other vehicle 120 (in consideration of the lengths and the widths of the other vehicle 120 and the corresponding vehicle) when a travel direction of the other vehicle 120 has a rightmost angle. ③ denotes a maximum movable region of the other vehicle 120 (in consideration of the lengths and the widths of the other vehicle 120 and the corresponding vehicle) when a travel direction of the other vehicle 120 has a leftmost angle.

Figure 7:
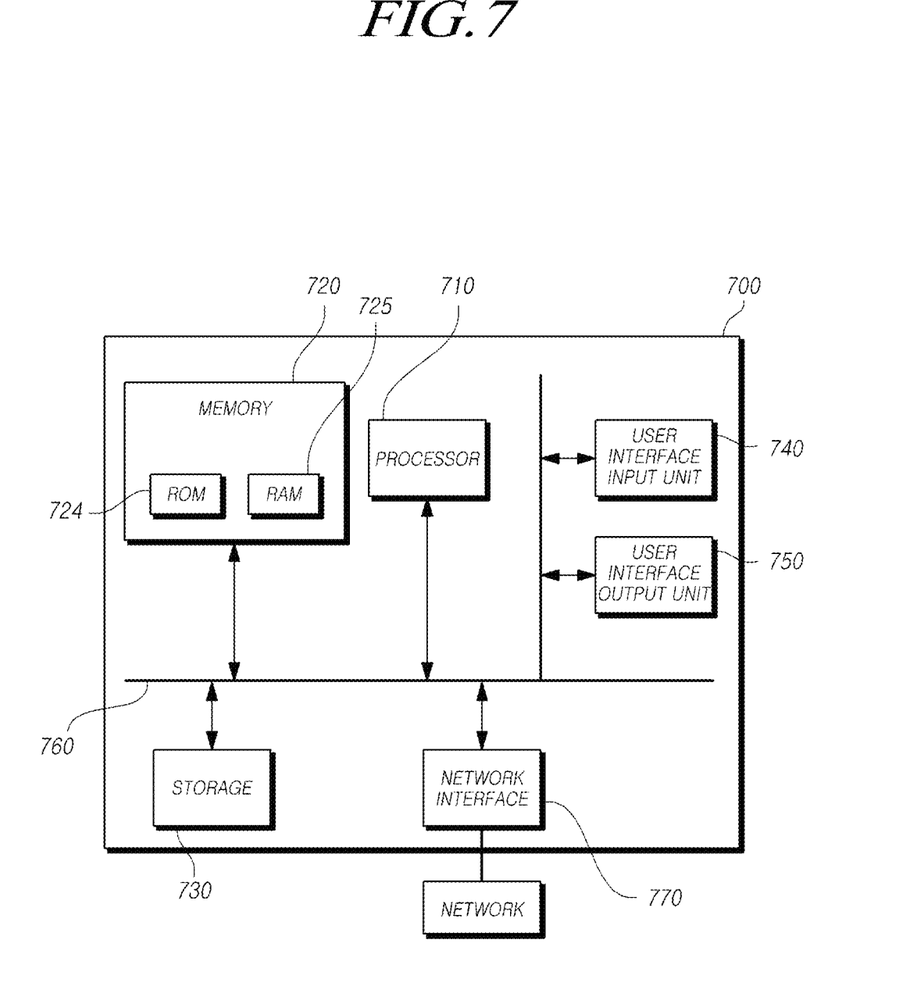
FIG. 7 is a block diagram of an apparatus for vehicle control according to another embodiment of the present disclosure.

FIG. 7 is a block diagram of a vehicle control apparatus according to another embodiment of the present disclosure.

The above-described embodiments of the present disclosure may be implemented as, for example, a computer-readable recording medium in a computer system. As shown in FIG. 7, a computer system 700 of the vehicle control apparatus 112 and the like may include one or more elements among at least one processor 710, a memory 720, a storage 730, a user interface input unit 740, and a user interface output unit 750, and the elements may communicate with each other via a bus 760. Also, the computer system 700 may include a network interface 770 for accessing a network. The processor 710 may be a central processing unit (CPU) or a semiconductor device which executes processing instructions stored in the memory 720 and/or the storage 730. The memory 720 and the storage 730 may include various types of volatile/non-volatile storage media. For example, the memory 720 may include a read-only memory (ROM) 724 and a random access memory (RAM) 725.

Accordingly, the embodiments of the present disclosure may be implemented as a non-volatile computer recording medium in which a method implemented by a computer or computer-executable instructions are stored. When the aforementioned instructions are executed by a processor, a method according to at least one embodiment of the present disclosure may be performed.

According to an embodiment of the present disclosure, it is possible to control a vehicle on the basis of 3D space recognition.

According to another embodiment of the present disclosure, it is possible to control a vehicle on the basis of 3D space recognition in which specification information of another vehicle is used.

According to another embodiment of the present disclosure, it is possible to control a vehicle on the basis of an expected travel region of another vehicle.

According to another embodiment of the present disclosure, it is possible to form a travel path of a vehicle on the basis of 3D space recognition.

The present disclosure has been described above with reference to embodiments thereof. Those of ordinary skill in the art will appreciate that various modifications and changes may be made thereto without departing from the essential features of the disclosure. Therefore, the described embodiments are to be construed as illustrative and not as limiting. The scope of the present disclosure is not defined by the detailed description and shall be construed on the basis of the accompanying claims in such a manner that all of the technical ideas included within the scope equivalent to the claims belong to the present disclosure.

What is claimed is:

1. A system for vehicle control, the system comprising:
an image sensor mounted to a host vehicle to have a field of view out of the host vehicle and configured to capture image data;
a communicator configured to receive specification information of at least one of other vehicles existing outside the host vehicle and included in the image data captured by the image sensor, wherein the specification information of at least one of the other vehicles includes a width and length of at least one of the other vehicles and is transmitted from at least one of the other vehicles; and
a controller configured to:
generate spatial information around the host vehicle based on the image data captured by the image sensor of the host vehicle;
modify the spatial information around the host vehicle, which is generated by the host vehicle, based on the specification information of at least one of the other vehicles including the width and length of at least one of the other vehicles and transmitted from at least one of the other vehicles; and
generate a control signal for controlling the host vehicle based on the modified spatial information around the host vehicle, modified based on the specification information of at least of the other vehicles transmitted from at least one of the other vehicles.

2. The system of claim 1, wherein the controller is configured to:
acquire travel information of at least one of the other vehicles included in the spatial information around the host vehicle, generated based on the image data captured by the image sensor of the host vehicle,
determine an expected travel region of at least one of the other vehicles included in the spatial information around the host vehicle, generated based on the image data captured by the image sensor of the host vehicle, based on at least one of the specification information or the travel information of at least one of the other vehicles included in the spatial information around the host vehicle, generated based on the image data captured by the image sensor of the host vehicle, and
generate a travel path of the host vehicle in consideration of the expected travel region.

3. The system of claim 1, wherein the controller is configured to:
extract an other specification information of at least one of the other vehicles from the spatial information around the host vehicle, generated based on the image data captured by the image sensor of the host vehicle, and
generate the modified spatial information by comparing the specification information of at least one of the other vehicles, which is transmitted from at least one of the other vehicles, and the other specification information of at least one of the other vehicles, which is extracted from the spatial information around the host vehicle generated based on the image data captured by the image sensor of the host vehicle, and modifying the spatial information around the host vehicle, generated based on the image data captured by the image sensor of the host vehicle, based on comparison result between the specification information of at least one of the other vehicles, which is transmitted from at least one of the other vehicles, and the other specification information of at least one of the other vehicles, which is extracted from the spatial information around the host vehicle generated based on the image data captured by the image sensor of the host vehicle.

4. An apparatus for vehicle control, the apparatus comprising:
a first spatial information generator configured to generate spatial information around a host vehicle, based on at least one of image data or sensing data;
a vehicle specification receiver configured to receive specification information of at least one of other vehicles existing outside the host vehicle, wherein the specification information of at least one of the other vehicles includes a width and length of at least one of the other vehicles and is transmitted from at least one of the other vehicles; and
a second spatial information generator configured to modify the spatial information around the host vehicle, which is generated based on at least one of the image data or the sensing data by the host vehicle, based on the specification information of at least one of the other vehicles including the width and length of at least one of the other vehicles and transmitted from at least one of the other vehicles.

5. The apparatus of claim 4, further comprising a travel path generator configured to generate a travel path of the host vehicle based on the spatial information around the host vehicle, generated based on at least one of the image data or the sensing data.

6. The apparatus of claim 5, wherein the travel path generator is configured to:
extract travel information of at least one of the other vehicles included in the spatial information from at least one of the image data or the sensing data and determine an expected travel region of at least one of the other vehicles included in the spatial information based on at least one of the specification information of at least one of other vehicles or the travel information of at least one of the other vehicles included in the spatial information around the host vehicle; and
generate a travel path of the host vehicle based on the expected travel region of at least one of the other vehicles included in the spatial information around the host vehicle.

7. The apparatus of claim 6, wherein the travel space prediction module is configured to, when at least one of the other vehicles included in the spatial information generated based on at least one of the image data or the sensing data is located in front of the host vehicle and is traveling on a road on which the host vehicle is traveling, display the expected travel region behind at least one of the other vehicles in the modified spatial information modified based on the specification information of at least of the other vehicles transmitted from at least one of the other vehicles.

8. The apparatus of claim 6, wherein the travel space prediction module is configured to, when at least one of the other vehicles included in the spatial information generated based on at least one of the image data or the sensing data is located in front of the host vehicle and is traveling to approach the host vehicle, display the expected travel region in front of at least one of the other vehicles in the modified spatial information modified based on the specification information of at least one of the other vehicles.

9. The apparatus of claim 6, wherein the travel space prediction module is configured to, when at least one of the other vehicles included in the spatial information generated based on at least one of the image data or the sensing data is a preceding vehicle which is located in front of the host vehicle and is traveling on a road adjacent to a road on which the host vehicle is traveling or a crossing vehicle which is located in front of the host vehicle and is traveling in a direction of moving away from the host vehicle, display the expected travel region behind and in front of at least one of the other vehicles in the modified spatial information modified based on the specification information of at least one of the other vehicles.

10. The apparatus of claim 4, wherein the second spatial information generator is configured to:
extract another specification information of at least one of the other vehicles from the spatial information generated based on at least one of the image data or the sensing data; and
generate the modified spatial information by comparing the specification information of at least one of the other vehicles, which is transmitted from at least one of the other vehicles, and the other specification information of at least one of the other vehicles, which is generated by the host vehicle based on at least one of the image data or the sensing data, and modify the spatial information around the host vehicle, generated based on at least one of the image data or the sensing data, based on comparison result between the specification information of at least one of the other vehicles, which is transmitted from at least one of the other vehicles, and the other specification information of at least one of the other vehicles, which is extracted from the spatial information generated based on at least one of the image data or the sensing data.

11. The apparatus of claim 4, wherein the specification information, which is transmitted from at least one of the other vehicles, further includes a maximum turnable angle of at least one of the other vehicles.

12. The apparatus of claim 4, wherein:
the image data comprises data captured by an image sensor, and
the sensing data comprises data captured by one or more non-image sensors including at least one of a radar sensor, a light detection and ranging (LiDAR) sensor, or an ultrasonic sensor.

13. The apparatus of claim 4, wherein the vehicle specification receiver is configured to receive the specification information of at least one of the other vehicles using vehicle-to-everything (V2X) communication.

14. A method for vehicle control, the method comprising:
generating, by a host vehicle, spatial information around the host vehicle, based on at least one of image data or sensing data;
receiving, by the host vehicle, specification information of at least one of other vehicles, included in the spatial information around the host vehicle and located around the host vehicle, wherein the specification information of at least one of the other vehicles includes a width and length of at least one of the other vehicles and is transmitted from at least one of the other vehicles;
modifying, by the host vehicle, the spatial information, which is generated by the host vehicle based on at least one of the image data or the sensing data, based on the specification information of at least one of the other vehicles including the width and length of at least one of the other vehicles and transmitted from at least one of the other vehicles; and
generate a control signal for controlling the host vehicle based on the modified spatial information around the host vehicle, modified based on the specification information of at least of the other vehicles transmitted from at least of the other vehicles.

15. The method of claim 14, further comprising generating a travel path of the host vehicle based on the spatial information generated based on at least one of the image data or sensing data.

16. The method of claim 15, wherein the generating of the travel path comprises extracting travel information of at least one of the other vehicles included in the spatial information by processing at least one of the image data or the sensing data, determining an expected travel region of at least one of the other vehicles included in the spatial information based on at least one of the specification information or the travel information of at least one of the other vehicles included in the spatial information, and generating a travel path of the host vehicle based on the expected travel region of at least one of the other vehicles included in the spatial information.

17. The method of claim 16, wherein the modifying of the spatial information comprises:
extracting an other specification information of at least one of the other vehicles, included in the spatial information around the host vehicle, from the spatial information around the host vehicle; and
generating the modified spatial information by comparing the specification information of at least one of the other vehicles, which is transmitted from at least one of the other vehicles, and the other specification information, which is extracted from the spatial information around the host vehicle by the host vehicle, and modifying the spatial information around the host vehicle based on comparison result between the specification information of at least one of the other vehicles, which is transmitted from at least one of the other vehicles, and the other specification information, which is extracted from the spatial information around the host vehicle.

18. The method of claim 14, wherein the specification information of at least one of the other vehicles, which is transmitted from at least one of the other vehicles, further includes a maximum turnable angle of at least one of the other vehicles.

19. The method of claim 14, wherein:
the image data is data captured by an image sensor, and
the sensing data is data captured by one or more non-image sensors comprising at least one of a radar sensor, a light detection or ranging (LiDAR) sensor, and an ultrasonic sensor.

20. The method of claim 14, wherein the receiving of the specification information of at least one of the other vehicles comprises receiving the specification information of at least one of the other vehicles using vehicle-to-everything (V2X) communication.

* * * * *